Figure 1:
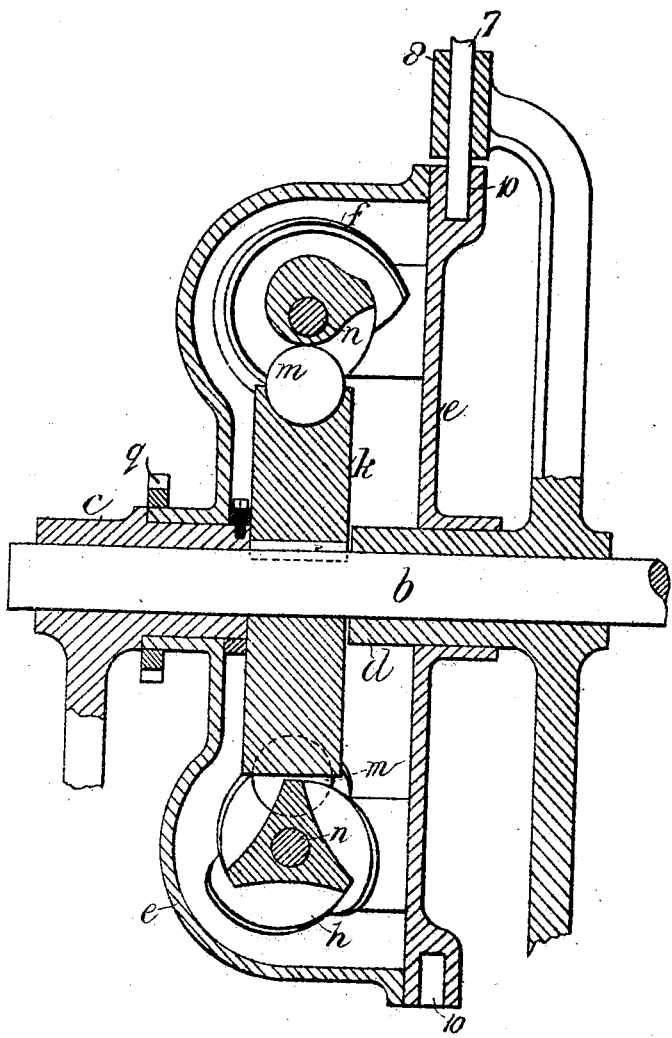

No. 896,691. PATENTED AUG. 18, 1908.
A. T. COLLIER.
CHANGE SPEED DRIVING GEAR.
APPLICATION FILED AUG. 20, 1907.

8 SHEETS—SHEET 1.

Witnesses.

Inventor.
Arthur T. Collier.
By James L. Norris
Atty.

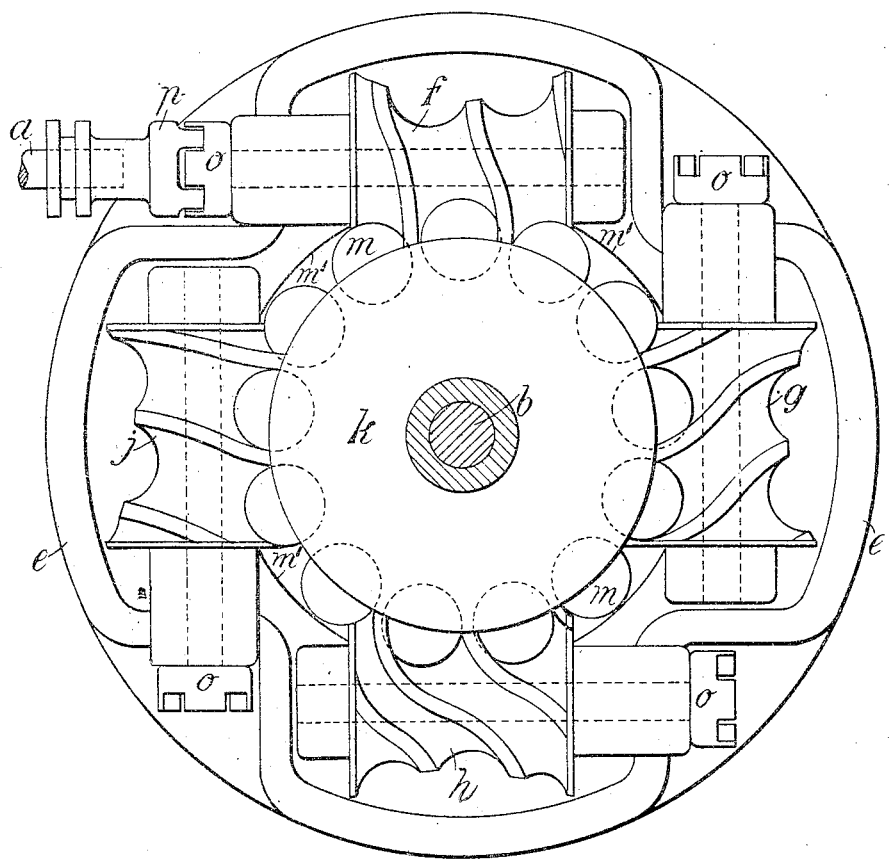

No. 896,691. PATENTED AUG. 18, 1908.
A. T. COLLIER.
CHANGE SPEED DRIVING GEAR.
APPLICATION FILED AUG. 20, 1907.

8 SHEETS—SHEET 3.

Witnesses.

Inventor.
Arthur T. Collier.
By James L. Norris
Atty.

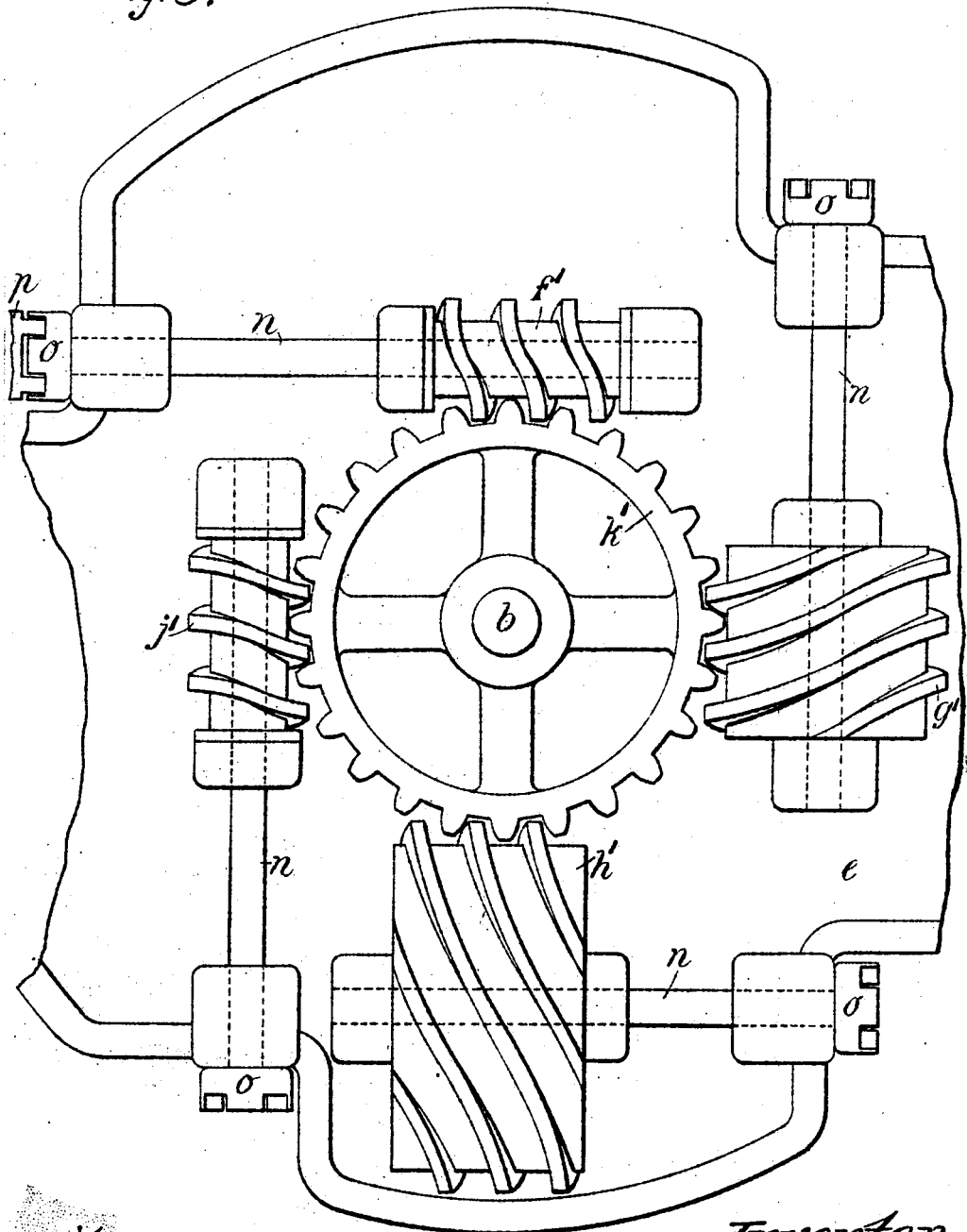

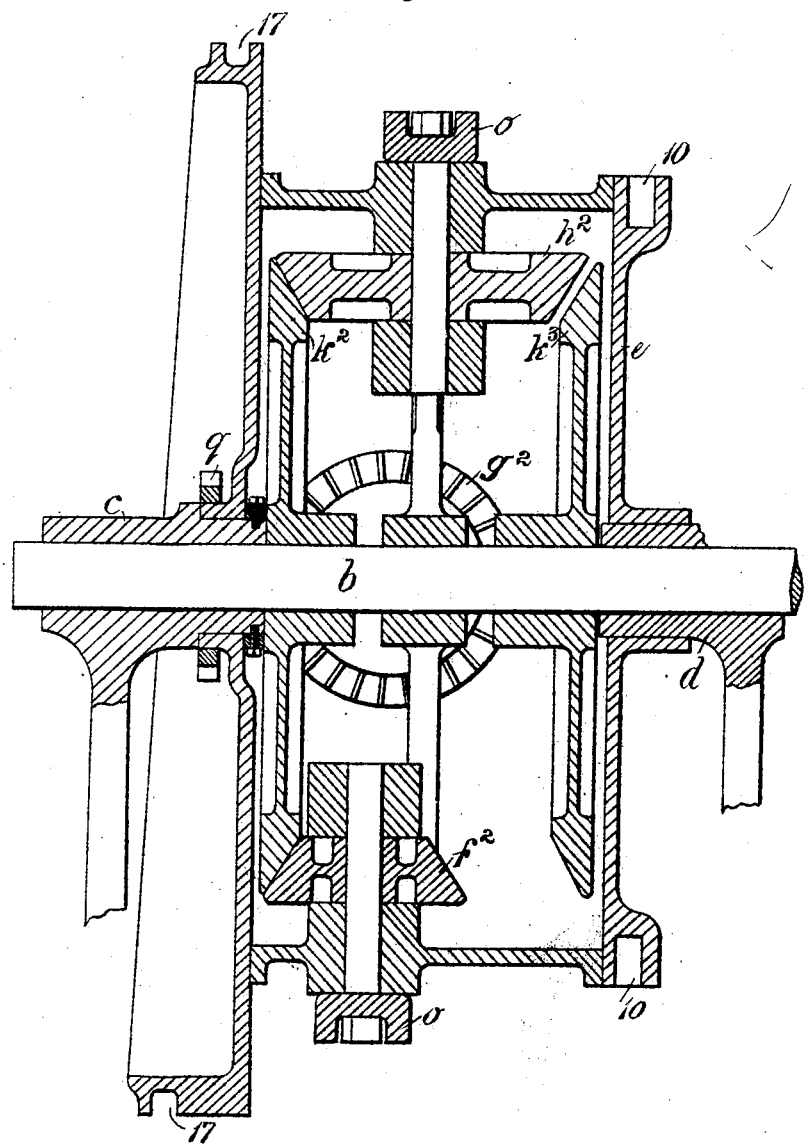

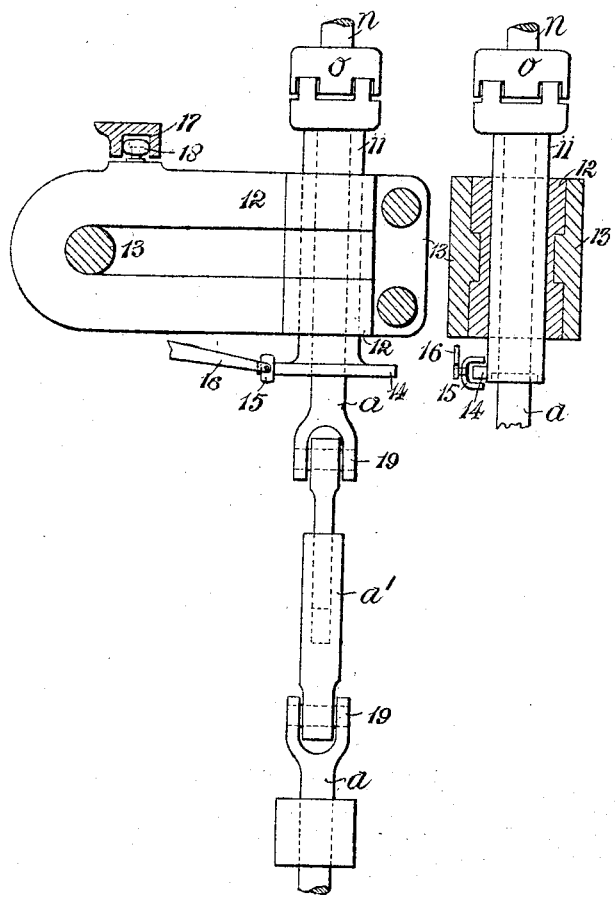

No. 896,691. PATENTED AUG. 18, 1908.
A. T. COLLIER.
CHANGE SPEED DRIVING GEAR.
APPLICATION FILED AUG. 20, 1907.

8 SHEETS—SHEET 8.

Witnesses.

Inventor.
Arthur T. Collier.
By James L. Norris.
Atty.

UNITED STATES PATENT OFFICE.

ARTHUR THOMAS COLLIER, OF ST. ALBANS, ENGLAND, ASSIGNOR OF ONE-FIFTH TO HARRY SEYMOUR FOSTER, OF LONDON, ENGLAND.

CHANGE-SPEED DRIVING-GEAR.

Specification of Letters Patent.     Patented Aug. 18, 1908.

Application filed August 20, 1907. Serial No. 389,412.

*To all whom it may concern:*

Be it known that I, ARTHUR THOMAS COLLIER, a subject of the King of Great Britain, residing at St. Albans, Herts, England, have invented certain new and useful Improvements in Change-Speed Driving-Gear, of which the following is a specification.

This invention relates to change speed driving gear for general application where variable speeds are required.

My improved gearing comprises a driven member, two or more intermediate and interchangeable members, and a clutch or like device for coupling the driving shaft to any one of the said intermediate members.

In one form of my improved gear as applied to worm driving, the driven member is a worm wheel round which are arranged two or more worms gearing with said wheel, and carried by a frame mounted to be rotatable about the driven shaft. Said frame is furnished with means for retaining it in any one of the driving positions and for releasing it and turning it to a different driving position when a change of speed is required. A clutch is provided for connecting the driving shaft to that worm which is in the driving position. When applied to worm gearing of the type in which the teeth of the worm wheel are formed by balls or rollers the different worms for giving the different speeds, are preferably all of the same diameter, but have respectively single, double, treble, etc., threads. On the other hand when applied to worm gearing having ordinary worm teeth, the slope of the worm threads is the same in the different worms, but the diameters of the several worms are different and proportional to the different speeds required. In this case the connection between the driving shaft and the worms is made adjustable to accommodate the different distances of the several worm spindles from the center of the driven shaft. I preferably make this connection automatically adjustable and controlled by the frame carrying the worms so that the adjustment is effected when the said frame is turned to bring the selected worm to the driving position.

My invention can be extended to change speed gears employing spur, bevel or face gears in lieu of worm gearing, the several intermediate gear wheels being of different diameters and carried by a rotatable frame the same as above indicated with reference to worm driving.

In my improved gear, all the intermediate gears remain permanently in mesh with the driven wheel, but only one of them is connected to the driving shaft at any one time, the remaining ones running loose.

Figure 4:
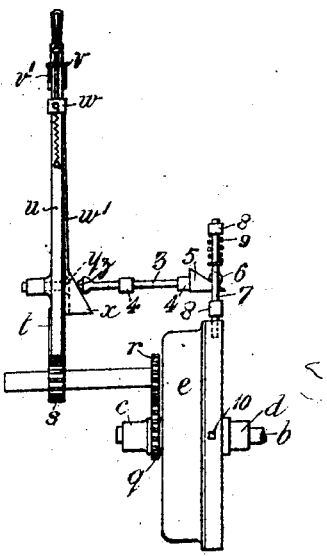
Figure 4A:
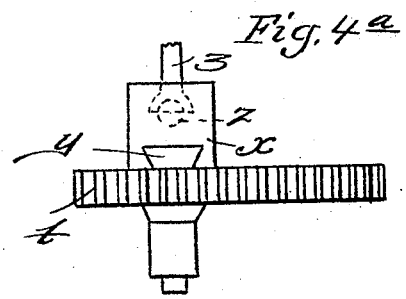
Figure 3:
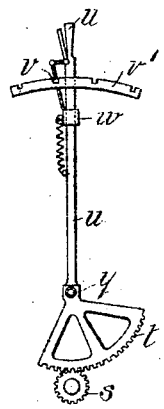
Figure 7:
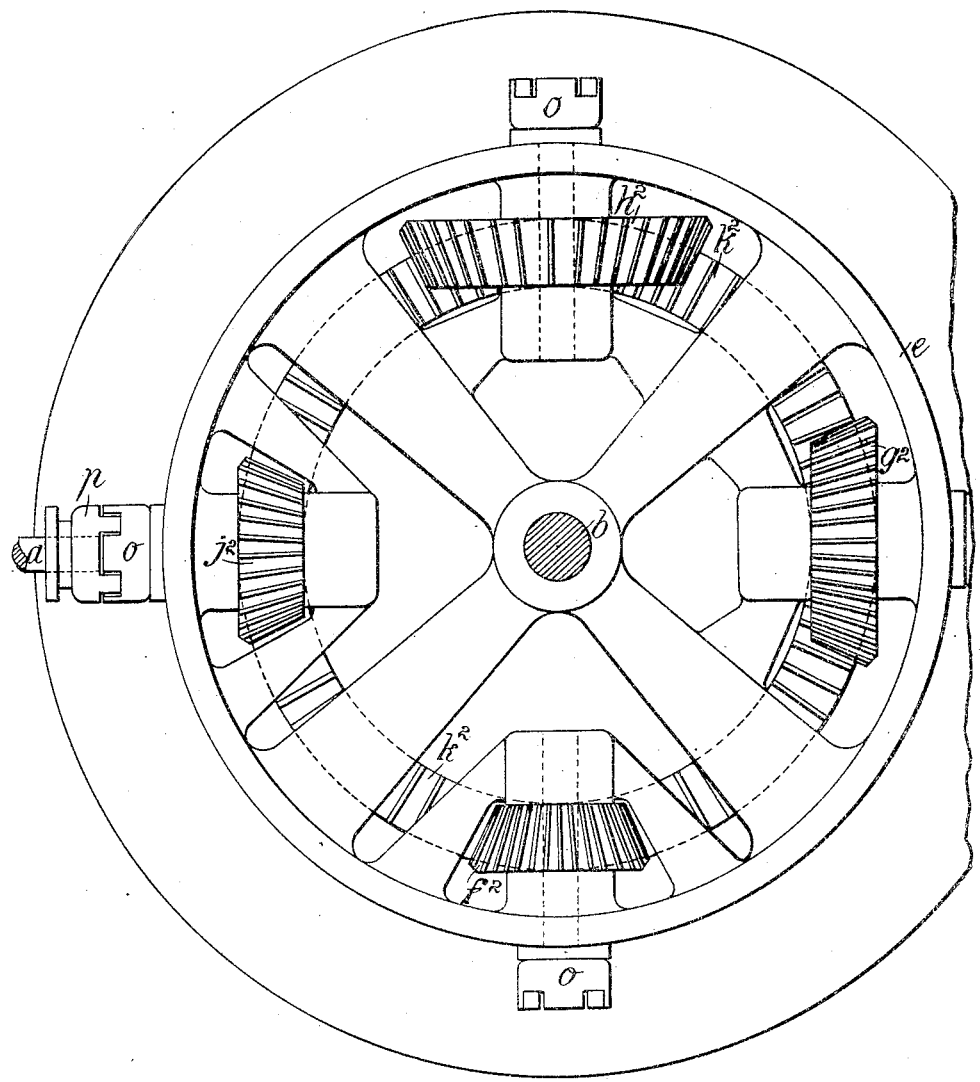
Figure 10:
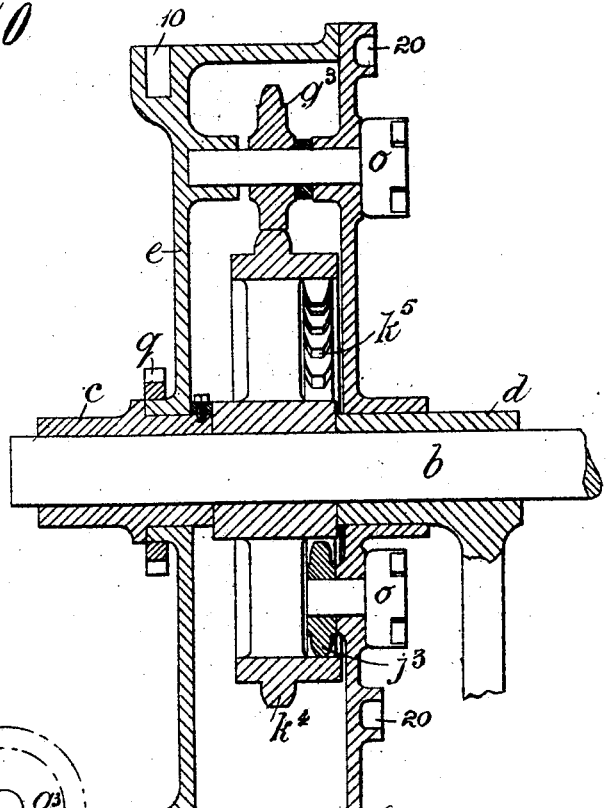
Figure 11:
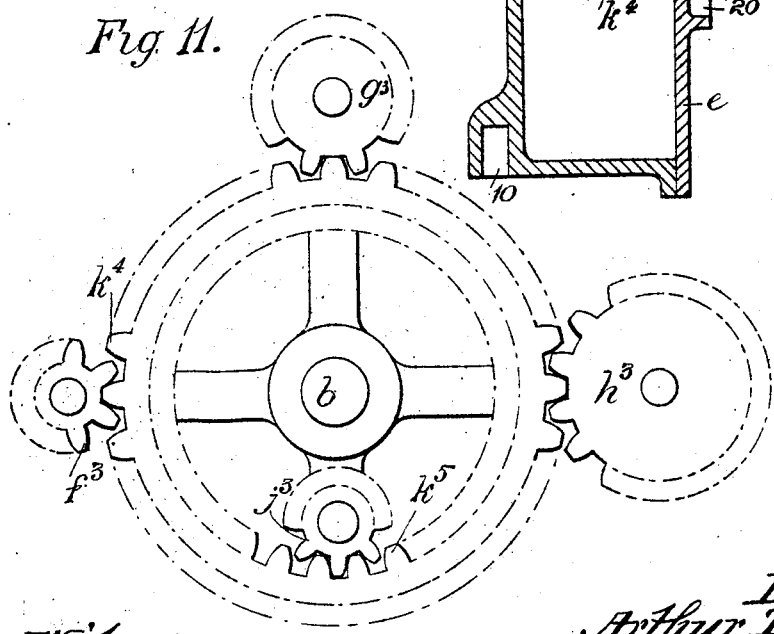

In the accompanying drawings: Figure 1 is a vertical central section, and Fig. 2 a side elevation with parts removed showing the preferred form of my improved gearing. Fig. 3 is a side elevation and Fig. 4 a front elevation of the lever for controlling the change-speed gear. Fig. 4ª is an under-side view drawn to an enlarged scale and with parts removed, showing the means for guiding the wedge $x$ in Figs. 3 and 4. Fig. 5 is a similar view to Fig. 2 showing a modified form of construction of my improved gearing. Figs. 6 and 7 are similar views to Figs. 1 and 2, showing another modification of my improved gearing. Fig. 8 is a plan, and Fig. 9 a longitudinal section showing a detail of construction. Fig. 10 is a similar view to Fig. 1, and Fig. 11 is a diagrammatic side view of the gearing only, showing a further modification of my improved change-speed gear.

Like letters indicate corresponding parts throughout the drawings.

Referring to Figs. 1 and 2, $a$ is the driving shaft and $b$ the driven shaft, which turns in suitable bearings here shown as bushes or sleeves $c$, $d$. On these sleeves turns a casing $e$ in which are rotatably mounted worms $f$, $g$, $h$, $i$, all permanently in gear with a worm-wheel $k$ fixed to the shaft $b$. These worms preferably run in ball bearings so as to reduce friction to a minimum. Of these worms $f$, $g$ and $h$ have right-handed threads, $f$ being a single-, $g$ a double- and $h$ a treble-threaded worm and the velocity-ratios obtained being proportional to the number of threads; $i$ is a single-threaded worm with a left-handed single thread, so as to produce a slow-speed motion of the driven shaft in the reverse direction. The worm-wheel $k$ is made with ball-teeth $m$, $m$ which are capable of turning in all directions about their own centers in suitable sockets in the periphery of the said wheel. These balls, when not in engagement with the worms, are retained in their sockets by means of guide-surfaces $m'$, $m'$ on the casing $e$. The shafts $n$ of these worms are provided with clutch-members o which are adapted to engage a corresponding relatively-movable clutch-member p on the driving shaft a, this member p being actuated in any suitable manner, for example, by the gearing actuating the main clutch of a motor car, or as hereinafter described. The casing e is moreover provided with a gear-wheel q fixed thereto for enabling it to be rotated on the bushes c, d, so as to bring any one of the worm-shafts n, n into line with the driving shaft a. The gear-wheel q engages with a rotatably mounted gear-wheel r fixed to a gear-wheel s which gears with a toothed segment t on the hand-lever u. The usual locking-bolt v for engaging with a toothed sector v' is also connected through a slide w and rod w' to a wedge-piece x which slides by means of a longitudinally extended dove-tailed slot on a circular guide y formed at the end of the pivot-shaft of the lever u. The wedge-piece x coacts with a ball z rotatably mounted in one end of a rod 3 which slides longitudinally in guides 4, 4 arranged coaxially with the guide y. The rod 3 bears at its other end a wedge-piece 5 which coacts with a roller 6 mounted in a rod 7 that slides longitudinally in guides 8, 8 and is pressed downwards by a spring 9. The lower end of the rod 7 forms a bolt for engaging with one or other of a series of recesses 10, 10 formed in the periphery of the casing e, in such a manner as to prevent rotation of said casing on the sleeves c, d. By these means, when the locking bolt v of the lever u is removed from a notch in the sector v', the rod 7 will be simultaneously removed from the recess 10 in which it was lying and the casing e can be turned by the lever u; by releasing the bolt v, the lever u and the casing e can be simultaneously locked in any one of their operative positions. Other suitable mechanism may however be employed for rotating the casing or frame e and securing it in position.

In the arrangement shown in Fig. 5, the worm-wheel k' and the worms f', g', h', j' are made with ordinary teeth, the angles of the worm-threads being made the same and the diameters different to correspond with the velocity-ratios desired. In this construction, means are provided whereby the shaft a and clutch-member p may be automatically moved up and down to correspond with the variation in the distances between the axes of the worm-shafts n and the driven shaft b, these means being of similar construction to those to be hereinafter described with reference to Figs. 6 to 9 for automatically moving the shaft a and clutch-member p horizontally from side to side.

In Figs. 6 and 7, a form of my improved gearing is shown in which there is a series of bevel-wheels $f^2$, $g^2$, $h^2$ rotatably mounted in the casing e and permanently engaging with a larger bevel-wheel $k^2$ fixed on the driven shaft b for giving three different speeds in one direction, and a bevel-wheel $j^2$, which is also rotatably mounted in the casing e and which permanently engages with a bevel-wheel $k^3$ also fixed on the shaft b but arranged on the opposite side of the bevel-wheel $j^2$ to that at which the bevel-wheel $k^2$ is arranged relatively to the bevel-wheels $f^2$, $g^2$, $h^2$, so as to give rotation at a slow speed in the other direction. In this arrangement, the driving shaft a is mounted in a bearing 11 (Figs. 8 and 9) arranged to slide axially in a carriage 12 which is capable of sliding transversely in fixed guides 13, 13 and the bearing 11 is provided with a rib or web 14 for engaging with a fork 15 pivotally mounted on the clutch-operating lever 16, so as to allow the bearing 11 and shaft a to be moved axially in the slide 12 in all positions of said slide, the transverse movement of which is effected by means of a cam-groove 17 provided on the casing e and coacting with an antifriction roller 18 on the slide 12. The shaft a is provided with a telescopic section a' connected therein by Cardan joints 19, 19, so as to permit the longitudinal extension thereof necessitated by throwing the clutch into and out of engagement and by the transverse motion of the movable clutch-member p.

In the arrangement shown in Figs. 10 and 11, a gear-wheel $k^4$ is fixed to the shaft b and permanently engages with pinions $f^3$, $g^3$ and $h^3$ rotatably mounted in the casing e, for giving three different speeds in one direction, while an internal gear-wheel $k^5$ is formed integrally with the gear-wheel $k^4$ and permanently engages with a gear-pinion $j^3$ rotatably mounted in the casing e for giving a slow speed of the shaft b in the reverse direction. The shaft a and clutch-member p can be moved towards and away from the shaft b by means of a cam-groove 20 on the casing e in a similar manner to that illustrated in Figs. 8 and 9. In this case however the driving and driven shafts are parallel to each other instead of at right angles as in the arrangements already described.

What I claim is:—

1. Change-speed driving gear comprising a frame, a gear-wheel rotatably mounted in said frame, worms gearing with said gear-wheel and rotatably mounted in said frame, a shaft rotatably mounted adjacent to said frame, means for coupling said shaft to either of said worms, and means for bringing said frame into and securing it in the respective positions in which the several worms are coupled to said shaft.

2. Change-speed driving gear comprising a frame, a gear-wheel rotatably mounted in said frame, worms of varying pitch and direction of thread gearing with said gear wheel and rotatably mounted in said casing, a shaft rotatably mounted adjacent to said casing, means for coupling said shaft to either of said worms, and means for bringing said casing into and securing it in the respective positions in which the several worms are coupled to said shaft.

3. Change-speed driving gear comprising a driving member, a driven member, a plurality of intermediate and interchangeable members arranged tangentially of and permanently in gear with said driven member, and a clutch for coupling said driving member to any one of said intermediate members.

4. Change-speed driving gear comprising a frame, a gear-wheel rotatably mounted in said frame, gears engaging said gear-wheel and rotatably mounted in said frame, a shaft rotatably mounted adjacent to said frame, means for coupling said shaft to either of said gears, means for bringing said frame into and securing it in the respective positions in which the several gears are coupled to said shaft, and means for moving said shaft to bring it into registration with said gears.

5. Change-speed driving gear comprising a frame, a wheel rotatably mounted in said frame and having a series of recesses in its periphery, ball teeth mounted to rotate in all directions in said recesses, globoid worms engaging said ball teeth and rotatably mounted in said frame, guides for said balls arranged between said worms, a shaft rotatably mounted adjacent to said frame, means for coupling said shaft to either of said gears, and means for bringing said frame into and securing it in the respective positions in which the several worms are coupled to said shaft.

6. Change-speed driving gear comprising a frame, a gear-wheel rotatably mounted in said frame, gears engaging said gear-wheel and rotatably mounted in said frame, a shaft rotatably mounted adjacent to said frame, means for coupling said shaft to either of said gears, means for bringing said frame into and securing it in the respective positions in which the several gears are coupled to said shaft, an extensible section in said shaft, universal joints at the ends of said extensible shaft-section, a bearing supporting the coupling-end of said shaft, a block in which said bearing can slide axially, a guide in which said block can slide transversely, a cam on said frame for moving said block in said guide, and means for moving said bearing in said block.

In testimony whereof I have hereunto set my hand in presence of two subscribing witnesses.

ARTHUR THOMAS COLLIER.

Witnesses:
GEORGE HARRISON,
HERBERT A. BEESTON